Sept. 27, 1955   R. D. HUTTON   2,719,215
VEHICLE SIGNAL LAMP
Filed May 1, 1953

INVENTOR.
Robert D. Hutton
BY
McMorrow, Berman & Davidson
Attorneys

United States Patent Office 2,719,215
Patented Sept. 27, 1955

2,719,215
VEHICLE SIGNAL LAMP
Robert D. Hutton, South San Gabriel, Calif.

Application May 1, 1953, Serial No. 352,426

3 Claims. (Cl. 240—8.3)

This invention relates to vehicle signal lamps and more particularly to a signal lamp designed to provide light of substantially uniform intensity over a wide horizontal angle and within a wide range of distances from the lamp.

It is among the objects of the invention to provide an improved signal lamp, such as a stop or tail light lamp for the rear end of an automotive vehicle, which can be mounted on an associated vehicle for movements of adjustment relative to the vehicle portion on which the lamp is mounted; which produces a preferably colored signal light of uniform intensity over a wide horizontal angle and a restricted vertical angle and maintains a substantially uniform appearance and high visibility at various distances from the lamp; which produces a light which is of materially higher intensity than the light of the usual commercial signal lamp and, at the same time, is substantially without glare when viewed by the driver of a vehicle following the vehicle on which the signal lamp is mounted; which utilizes at least two lamp bulbs illuminated at the same time to provide the brilliant light ordinarily provided by the lamp and to provide a safety factor in the event one of the lamp bulbs should burn out; and which is simple and durable in construction, economical to manufacture, easy to install, and neat and attractive in appearance.

Other objects and advantages will become apparent from a consideration of the following description and the appended claims in conjunction with the accompanying drawing wherein:

Figure 1:
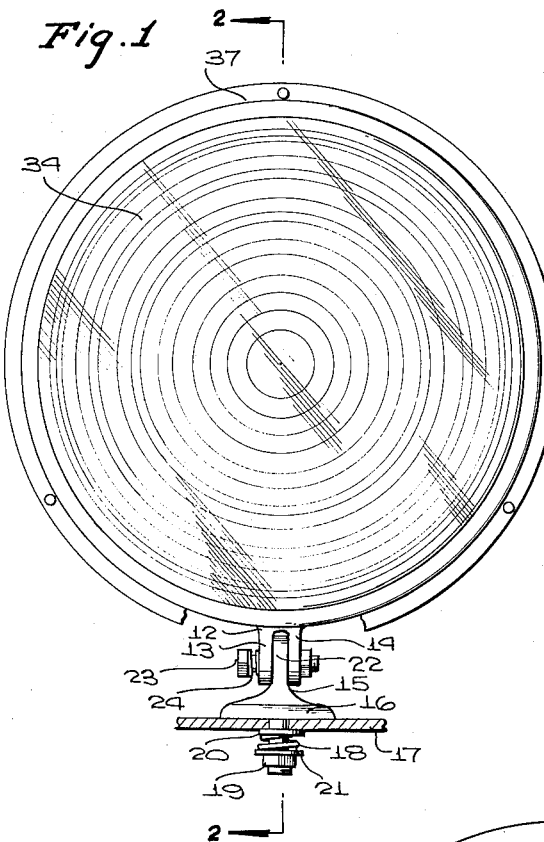
Figure 1 is a front elevational view of a signal lamp illustrative of the invention.

With continued reference to the drawing, the lamp comprises a thin walled housing 10 of partly spheroidal shape having its edge surrounded by an external annular flange 11 and having a stem 12 projecting therefrom adjacent to and radially of the edge thereof. At a location spaced from the lamp housing the stem 12 is bifurcated and apertured to provide spaced apart and substantially parallel legs 13 and 14 each provided with an aperture near its distal end. A mounting bracket 15 for supporting the lamp comprises a circular head 16 adapted to be disposed on the surface of a portion 17 of an associated vehicle, a stem 18 projecting perpendicularly from one side of the head 16 centrally of the head and extending through an aperture in the vehicle portion 17, a nut 19 threaded onto the screw threaded distal end portion of the stem 18 and a compression spring 20 and an abutment washer 21 surrounding the stem between the nut 19 and the inner or under surface of the vehicle portion 17, so that the mounting bracket can be rotated about the axis of the stem 18 relative to the vehicle portion 17 against frictional resistance provided by the spring 20. At its side opposite the stem 18 the head 16 is provided with an apertured lug 22 disposed between the legs 13 and 14 of the lamp stem 12 and a bolt 23 extending through the registering apertures in the legs 12 and 13 and the lug 22 pivotally mounts the lamp housing on the bracket 15 for pivotal movement about an axis perpendicular to the axis of the bracket stem 18. A compression spring 24 disposed between the head of the bolt 23 and the adjacent leg 13 of the lamp stem 12 compresses the legs 13 and 14 of the lamp stem against the correspondingly opposite sides of the bracket lug 22 to provide frictional resistance to movements of the lamp housing about the axis of the pivotal connection provided by the bolt 23.

With this arrangement, the lamp can be adjustably moved relative to the vehicle portion 17 on which the lamp is mounted and will be held in adjusted position by the frictional resistance provided by the springs 20 and 24.

Figure 2:
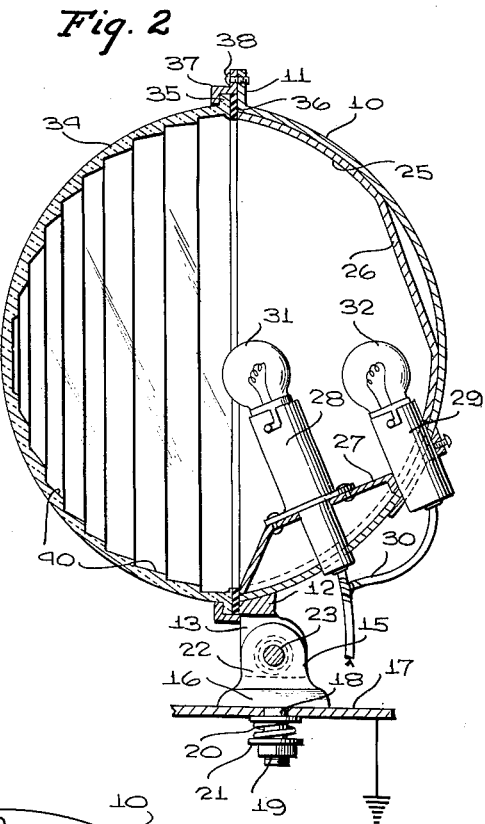
Figure 2 is a cross sectional view on the line 2—2 of Figure 1.
Figure 3:
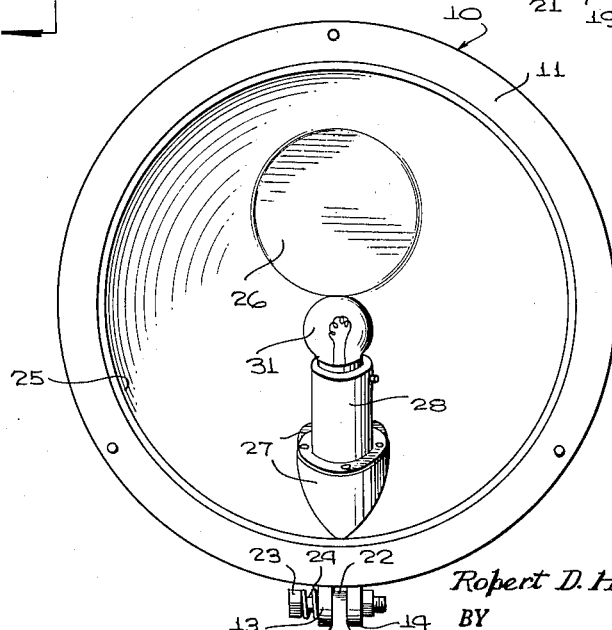
Figure 3 is a front elevational view of the lamp with the transparent cover of the lamp removed.

As the lamp stem 12 will ordinarily be disposed at the bottom side of the lamp housing 10, and depend from the lamp housing to the bracket 16, the following description will refer to upper and lower positions relative to the mounting of the lamp as illustrated in Figures 1 and 2 with the stem 12 at the bottom side of the lamp housing.

A thin walled reflector 25 of partly spheroidal shape is disposed in the lamp housing 10 and is provided with a flat central portion 26 of circular outline disposed above the center of the lamp housing. A bulb socket supporting bracket 27 is secured in the lower portion of the reflector extending from the edge of the reflector to a location inwardly of the reflector edge and bulb sockets 28 and 29 are mounted in the bracket 27 and extend through registering apertures in the reflector and the lamp housing to the exterior of the lamp housing. A conductor wire 30 is connected to the outer ends of the sockets 28 and 29 and the shells of the sockets are grounded on the bracket 27 to provide an energizing circuit for lamp bulbs mounted in the sockets. The sockets are positioned in the reflector 25 and housing 10, so that their longitudinal center lines are disposed substantially in a plane which is disposed radially of the edge of the lamp housing and perpendicular to the plane of the edge of the lamp housing and spaced apart along the radial plane at different distances from the plane of the edge of the lamp housing. Lamp bulbs 31 and 32 are mounted in the sockets 28 and 29 respectively, and have their filaments disposed below the center of the central portion 26 of the reflector and at locations spaced apart along a line perpendicular to the plane of the edge of the lamp housing.

A transparent and preferably colored cover 34 of partly spheroidal shape has its edge extending around the edge of the lamp housing 10 and the edge of the reflector 25, the edge of the cover being flanged, as indicated at 35, and a gasket 36 being interposed between the cover flange 35 and the housing flange 11. A bezel ring 37 is secured to the housing flange 11 by suitable means, such as the screws 38 angularly spaced apart around the flange 11 and overlaps the cover flange 35 to firmly secure the cover to the lamp housing.

With the above described arrangement, the location of the central portion of the reflector 25 above the center of the lamp housing 10 and above the filaments of the lamp bulbs 31 and 32 produces a light of restricted vertical angle, the outer lamp bulb 31 produces a light of wide horizontal angle, since its light is reflected from the outer portion of the reflector, and the lamp bulb 32 being disposed adjacent the reflector, in cooperation with the lamp bulb 31, produces a light of high intensity which has no weakening or shadow at its center, as is usually the case when the lamp bulb socket and lamp bulb are mounted in the central portion of the reflector.

The horizontal divergence of the light and the uniformity of the intensity of the light is further increased by providing the transparent cover 34 with internal concentric ribs or ridges 40 which diffuse the light issuing through the cover and causes a uniform blending of the light produced by the two bulbs 31 and 32.

While both of the bulbs 31 and 32 are required to produce a light of the desired intensity, if one of these bulbs should burn out, the remaining bulb will produce sufficient light to render the signal lamp clearly visible and the use of the two bulbs thus provides an important factor of safety in the use of the lamp.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A vehicle signal lamp comprising a housing of partly spheroidal shape, a mounting stem projecting from said housing adjacent to and substantially radially of the edge of the housing, means carried by said stem for mounting the lamp on a vehicle for movements of adjustment of the lamp relative to the associated vehicle, a reflector of partly spheroidal shape mounted in said housing and having a flat central portion displaced upwardly from the center of said housing when the lamp is in normal operative position, bulb socket structures mounted in the lower portion of said housing and spaced apart along a plane disposed radially of said housing edge and perpendicular to the plane of said edge, lamp bulbs mounted one in each of said socket structures and having filaments disposed below the center of said reflector and substantially along a line perpendicular to the plane of the edge of said housing, and a transparent cover of partly spheroidal shape secured around its edge to said housing around the edge of the latter and concavely opposed to said housing.

2. A vehicle signal lamp comprising a housing of partly spheroidal shape, means attached to said housing for mounting the lamp on an associated vehicle, a reflector of partly spheroidal shape mounted in said housing and having a flat central portion of circular outline displaced upwardly from the center of said housing when the lamp is mounted in operative position, bulb socket structures mounted in the lower portion of said housing and spaced apart along a plane disposed radially of said housing edge and perpendicular to the plane of said edge, lamp bulbs mounted one in each of said sockets and having filaments disposed below the center of said reflector and substantially along a line perpendicular to the plane of the edge of said housing, and a transparent cover of partly spheroidal shape secured around its edge to said housing around the edge of the latter and concavely opposed to said housing.

3. A vehicle signal lamp comprising a housing of partly spheroidal shape, means attached to said housing for mounting the lamp on an associated vehicle, a reflector of partly spheroidal shape mounted in said housing and having a flat central portion of circular outline displaced upwardly from the center of said housing when the lamp is mounted in operative position, bulb socket structures mounted in the lower portion of said housing and spaced apart along a plane disposed radially of said housing edge and perpendicular to the plane of said edge, lamp bulbs mounted one in each of said sockets and having filaments disposed below the center of said reflector and substantially along a line perpendicular to the plane of the edge of said housing, and a transparent cover of partly spheroidal shape secured around its edge to said housing around the edge of the latter and concavely opposed to said housing, said cover having concentric ridges of circular shape internally thereof to diffuse the light issuing through said cover from said lamp bulbs.

References Cited in the file of this patent

UNITED STATES PATENTS

| Number | Name | Date |
| --- | --- | --- |
| 1,403,924 | Topping | Jan. 17, 1922 |
| 1,471,166 | Jones | Oct. 16, 1923 |
| 1,485,074 | Gross | Feb. 26, 1924 |
| 1,661,798 | Gittery | Mar. 6, 1928 |
| 1,893,303 | Philips | Jan. 3, 1933 |
| 2,446,455 | Bowman | Aug. 3, 1948 |